(12) United States Patent
Ebbenga et al.

(10) Patent No.: US 8,636,110 B2
(45) Date of Patent: Jan. 28, 2014

(54) BOAT TRAILER MOUNTED BOW ENTRY LADDER

(75) Inventors: Mark Ebbenga, Forest Lake, MN (US); Amy Lee, Changhua County (TW); Daniel Lin, Changhua County (TW)

(73) Assignee: Bow Step, LLC, Forest Lake, MN (US)

( * ) Notice: Subject to any disclaimer, the term of this patent is extended or adjusted under 35 U.S.C. 154(b) by 110 days.

(21) Appl. No.: 12/833,273

(22) Filed: Jul. 9, 2010

(65) Prior Publication Data

US 2011/0011675 A1 Jan. 20, 2011

Related U.S. Application Data

(60) Provisional application No. 61/225,275, filed on Jul. 14, 2009, provisional application No. 61/265,473, filed on Dec. 1, 2009.

(51) Int. Cl.
*E06C 5/00* (2006.01)
*E06C 7/18* (2006.01)

(52) U.S. Cl.
USPC .......................................... 182/127; 182/106

(58) Field of Classification Search
USPC ................................ 182/86, 93, 97, 106, 127
See application file for complete search history.

(56) References Cited

U.S. PATENT DOCUMENTS

| | | | | |
|---|---|---|---|---|
| 470,374 A | * | 3/1892 | Fisher | 182/39 |
| 482,391 A | * | 9/1892 | Stanley | 182/89 |
| 854,645 A | * | 5/1907 | Jager | 182/18 |
| 1,439,030 A | * | 12/1922 | Stahl | 244/129.6 |
| 1,945,430 A | * | 1/1934 | Garrett | 403/66 |
| 2,222,636 A | * | 11/1940 | Strauss | 135/88.16 |
| 3,136,384 A | * | 6/1964 | Sweeney et al. | 182/106 |
| 3,305,045 A | * | 2/1967 | Schlecht | 182/97 |
| 3,762,500 A | * | 10/1973 | Sarno | 182/93 |
| 3,973,677 A | * | 8/1976 | Naka | 211/97 |
| 4,037,686 A | * | 7/1977 | Shull | 182/96 |
| 4,146,941 A | | 4/1979 | Haslam | |
| 4,482,029 A | * | 11/1984 | Prochaska | 182/96 |
| 4,807,719 A | * | 2/1989 | Burkstrand et al. | 182/15 |

(Continued)

FOREIGN PATENT DOCUMENTS

KR 1020020082168 A 10/2002

OTHER PUBLICATIONS

PCT International Search Report, Feb. 23, 2011.
PCT Written Opinion, Feb. 22, 2011.

*Primary Examiner* — Alvin Chin Shue
(74) *Attorney, Agent, or Firm* — Westman, Champlin & Koehler, P.A.; Z. Peter Sawicki

(57) ABSTRACT

In an first aspect, a ladder for mounting on a vehicle trailer includes an attachment bracket assembly for mounting on the trailer; a first side rail; a second side rail parallel to the first side rail; and a plurality of rungs pivotally connected to both the first and second side rails. The ladder is collapsible to decrease a distance between the first and second side rails. In a second aspect, a ladder for mounting on a vehicle trailer includes an attachment bracket; a first side rail; a second side rail parallel to the first side rail; a plurality of rungs connecting the first and second side rails; and a pivotal connection. The first and second side rails define a plane and the pivotal connection allows for rotation of the plane about a vertical axis. The pivotal connection is disposed between the attachment bracket and the first side rail.

9 Claims, 6 Drawing Sheets

(56) References Cited

U.S. PATENT DOCUMENTS

| | | | |
|---|---|---|---|
| 4,846,305 A * | 7/1989 | Kupfert | 182/97 |
| 5,046,582 A * | 9/1991 | Albrecht | 182/127 |
| 5,222,456 A | 6/1993 | Friedrich | |
| 5,896,946 A | 4/1999 | Brackett | |
| 6,119,809 A | 9/2000 | McClendon, Jr. | |
| 6,347,776 B1 * | 2/2002 | Chuang | 248/288.51 |
| 6,422,341 B1 * | 7/2002 | Engdahl | 182/106 |
| 6,755,146 B1 | 6/2004 | Garelick et al. | |
| 6,932,193 B2 | 8/2005 | Tombarello | |
| 7,100,740 B2 | 9/2006 | Newton | |
| 7,179,041 B2 | 2/2007 | Ebbenga | |
| 7,410,031 B2 | 8/2008 | Jensen | |
| 7,422,407 B2 | 9/2008 | Ebbenga | |
| 7,614,608 B1 | 11/2009 | Ebbenga | |
| 7,621,506 B2 | 11/2009 | Ebbenga | |
| 7,958,599 B2 * | 6/2011 | Easley | 16/224 |
| 2003/0075651 A1 * | 4/2003 | Pedersen | 248/229.13 |
| 2005/0039983 A1 | 2/2005 | Tombarello | |
| 2007/0000723 A1 | 1/2007 | Jensen | |
| 2007/0029137 A1 * | 2/2007 | Welsh | 182/96 |
| 2009/0283732 A1 | 11/2009 | Ebbenga | |
| 2010/0096215 A1 * | 4/2010 | McFarlane | 182/106 |

* cited by examiner

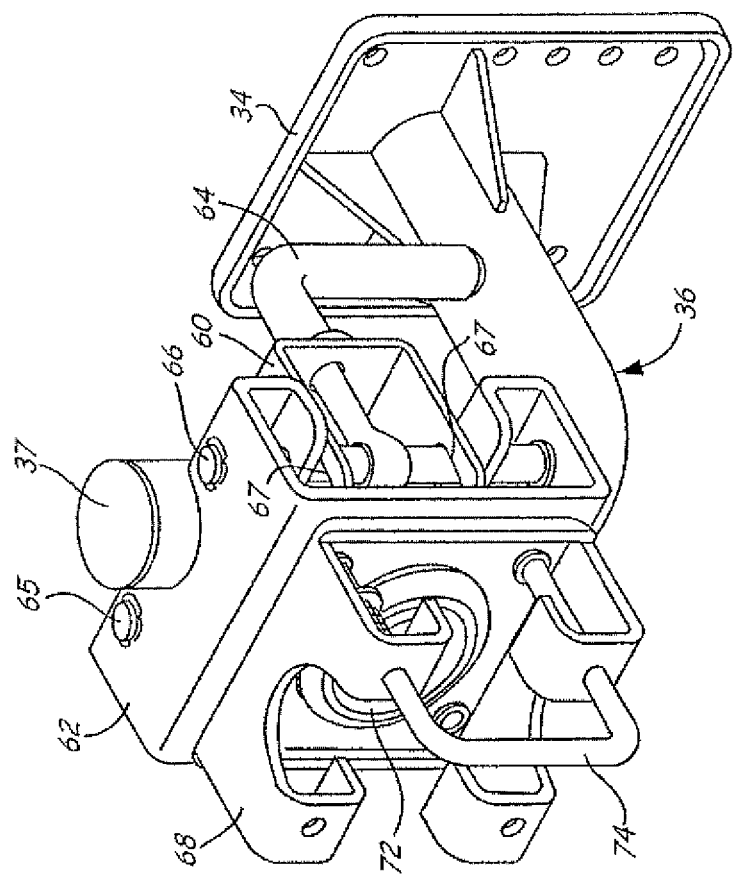
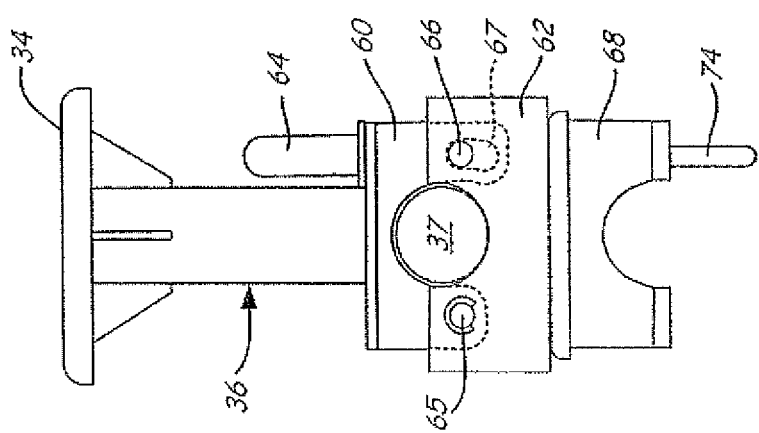
FIG. 4B
FIG. 4A

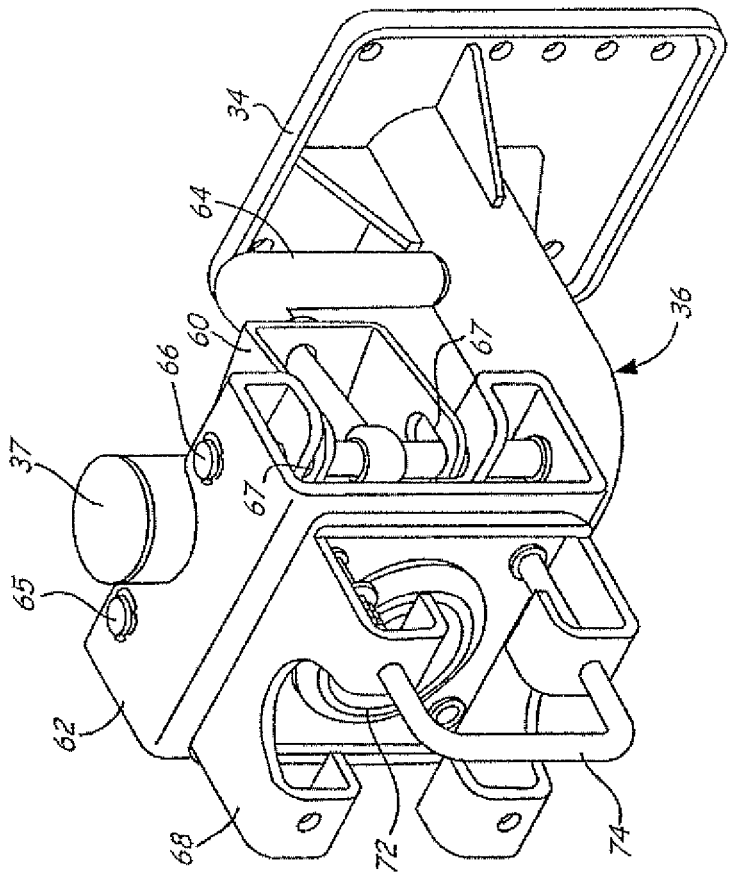
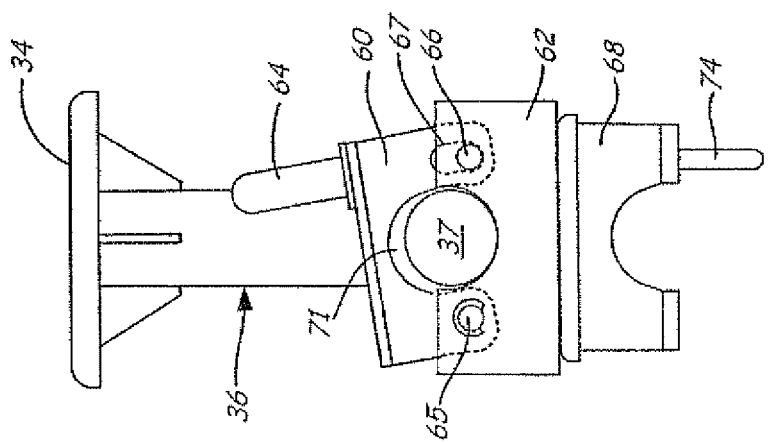
FIG. 5B
FIG. 5A

BOAT TRAILER MOUNTED BOW ENTRY LADDER

CROSS-REFERENCE TO RELATED APPLICATION

The present application is based on and claims the benefit of U.S. provisional patent applications Ser. No. 61/225,275, filed Jul. 14, 2009 and 61/265,473, filed Dec. 1, 2009, the content of which is hereby incorporated by reference in its entirety.

FIELD OF THE INVENTION

The present disclosure relates to an apparatus used for a person's entry onto the bow of a boat or descent from a bow of a boat as the boat rests on a trailer, truck bed, or other support surface. When a boat trailer is in the water, the apparatus facilitates the person's entry onto the boat or descent from the boat without the person getting wet.

BACKGROUND OF THE INVENTION

When a boat is being launched and the boat and trailer are backed into water, accessibility to the boat is restricted and usually not very easy to accomplish, especially when there is no dock. Boarding ladders of the type commonly provided with boats are typically designed for access from the water and thus may be located too high for convenient access to a boat on a trailer. However, it is often necessary to climb onto the bow of the boat either before launch or after loading the boat back onto the trailer. It is common to stand on the trailer near the winch, but it is difficult to get onto the bow or nose platform from the trailer without climbing on a ladder.

SUMMARY OF THE INVENTION

In a first aspect, a ladder for mounting on a vehicle trailer comprises an attachment bracket assembly for mounting on the trailer; a first side rail; a second side rail parallel to the first side rail; and a plurality of rungs pivotally connected to both the first and second side rails. The ladder is collapsible to decrease a distance between the first and second side rails.

In a second aspect, a ladder for mounting on a vehicle trailer comprises an attachment bracket for mounting on the trailer; a first side rail; a second side rail parallel to the first side rail; a plurality of rungs connecting the first and second side rails; and a pivotal connection. The first and second side rails define a plane and the pivotal connection allows for rotation of the plane about a vertical axis. The pivotal connection is disposed between the attachment bracket and the first side rail.

BRIEF DESCRIPTION OF THE DRAWINGS

FIG. 4A is a top view of the attachment bracket portion for the bow entry ladder assembly of FIG. 1, in a closed configuration.

FIG. 4B is a perspective view of the attachment bracket portion of FIG. 4A.

FIG. 5A is a top view of the attachment bracket portion for the bow entry ladder assembly of FIG. 1, in an open configuration.

FIG. 5B is a perspective view of the attachment bracket portion of FIG. 5A.

DETAILED DESCRIPTION OF THE PREFERRED EMBODIMENTS

Figure 1:
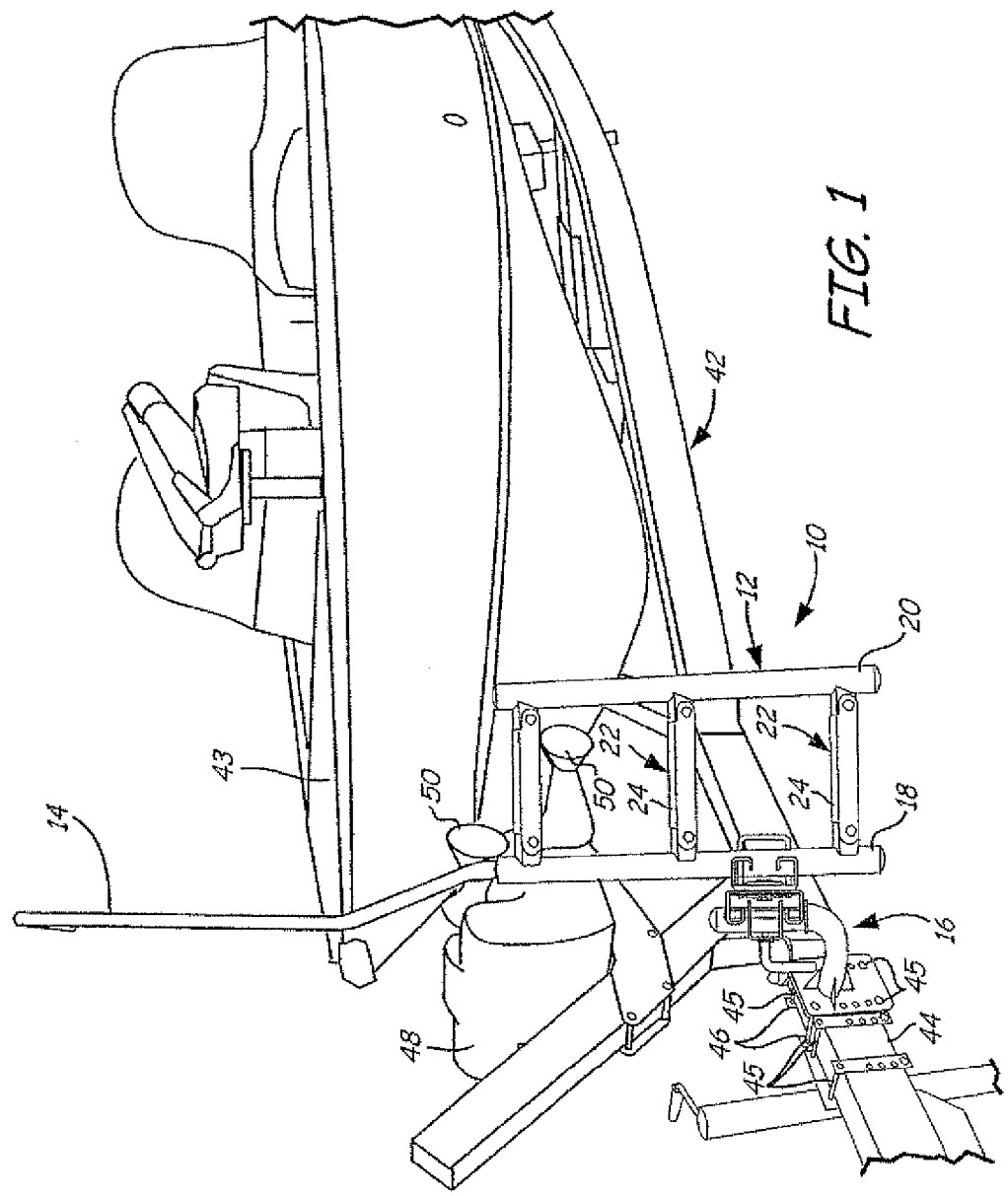
FIG. 1 is a perspective view of an exemplary embodiment of a boat trailer mounted bow entry ladder assembly in accordance with the present disclosure attached to a boat trailer.

Ladder assembly 10, illustrated in FIG. 1, includes ladder portion 12, hand rail portion 14 and attachment bracket portion 16. In an exemplary embodiment, ladder portion 12 includes parallel side rails 18, 20 joined by horizontal rungs 22. In one embodiment, a top surface 24 of rungs 22 includes a non-skid material for added safety. In an exemplary embodiment, side rail 18 is attached to hand rail portion 14 by the insertion of a lower section of hand rail portion 14 into side rail 18 and the use of fasteners such as bolts and nuts.

Figure 2:
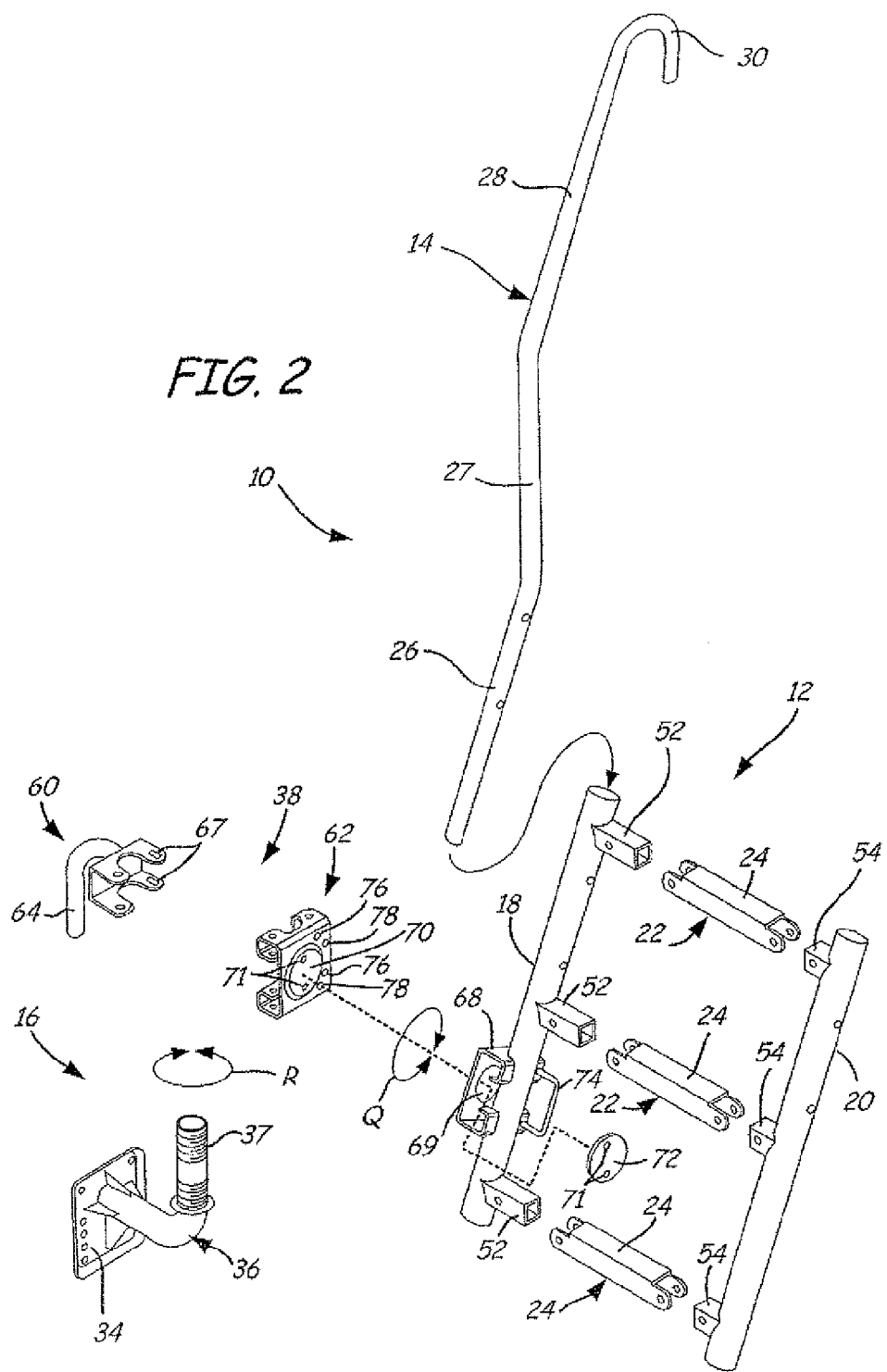
FIG. 2 is an exploded perspective view of the bow entry ladder assembly of FIG. 1.
Figure 3:
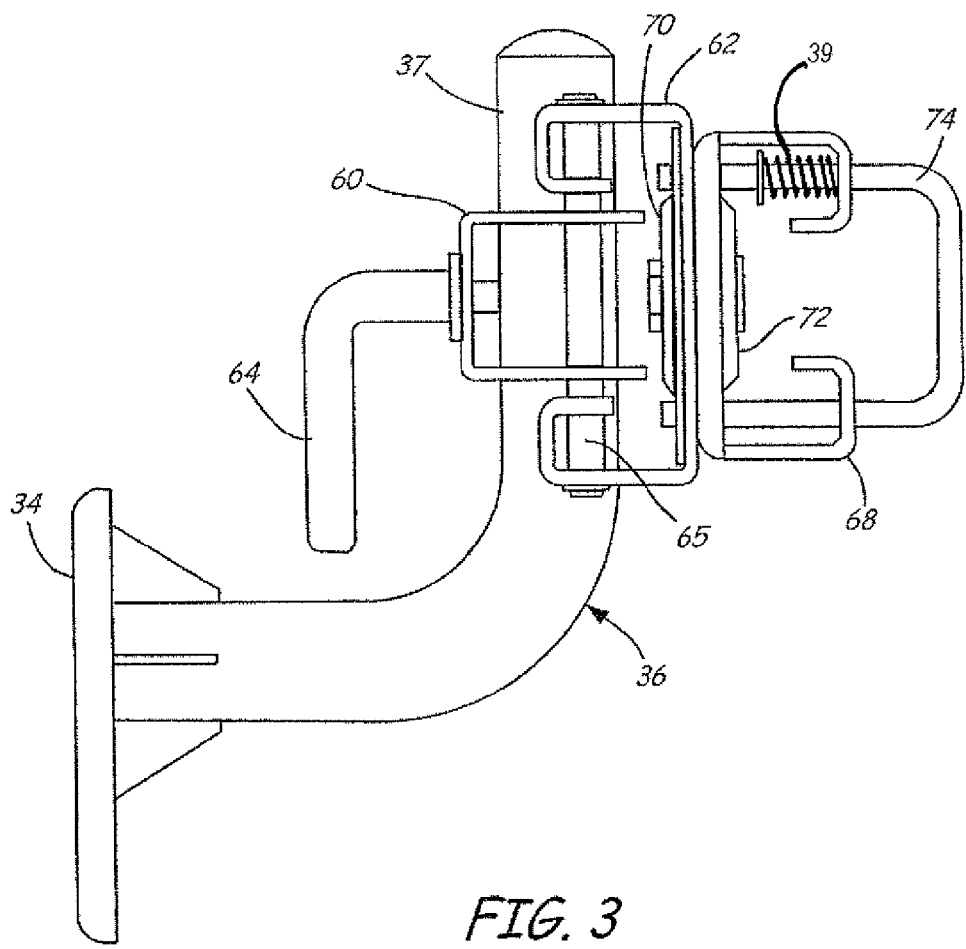
FIG. 3 is a side view of an exemplary attachment bracket portion for the bow entry ladder assembly of FIG. 1.

In the illustrated embodiment of FIG. 2, hand rail portion 14 is formed of a shaped length of tubular material that extends from side rail 18. Hand rail portion 14 has an insertion portion 26, slanted portion 27, hand grip portion 28, and top end 30. Insertion portion 26 fits within and is held by side rail 18. The angle of slanted portion 27 raises hand grip portion 28 relative to a user for increased ease of use, allows hand grip portion 28 to be positioned so as to give the user more room for movement, and prevents the hand grip portion 28 from contacting the bow of the boat 43. In an exemplary embodiment, hand grip portion 28 is substantially straight and parallel to side rails 18, 20. Top end 30 is rounded for comfort and safety. It is contemplated that hand rail portion 14 may take on other shapes and forms, including closed loop formations and non-tubular cross sections.

In an exemplary embodiment, bracket portion 16 includes bolt plate 34 for attachment of ladder assembly 10 to a boat trailer or other support surface. Extending outward and upward from bolt plate 34 is J-shaped tube extension member 36. On a vertical post 37 of extension member 36, a clamp assembly 38 holds ladder portion 12 in one of an infinite number of positions in a horizontal rotation plane R about an axis defined by vertically extending post 37. In an exemplary embodiment, the first side rail 18 and second side rail 20 of ladder portion 12 are substantially disposed in a plane. In an exemplary embodiment, rotation of the plane of ladder portion 12 about vertical post 37 for 360 degrees of plane R is possible, though structural interference of portions of ladder assembly 10 may prevent complete rotation when mounted on a trailer. Such a pivotal connection allows ladder portion 12 to be positioned proximate a boat bow when a user desires to board or descend from the boat; to be in different positions for different sized or shaped boat bows; and allows the ladder portion 12 to be moved out of the way when desired, such as during storage or transport.

FIG. 1 shows the attachment of ladder assembly 10 to a boat trailer 42 carrying a watercraft such as boat 43. A common type of boat trailer 42 includes a frame with a longitudinal member 44 terminating at a tongue mounting for a hitch (not shown). In an exemplary embodiment, bolt plate 34 cooperates with bolts 45 and fastening strips 46 about longitudinal member 44; thus, no structural modification of trailer 42 is needed for the use or repositioning of ladder assembly 10.

The longitudinal member 44 of such a conventional trailer commonly mounts a winch 48 for pulling the boat onto the trailer and launching the boat off the trailer. Particularly suitable winches are disclosed in U.S. Pat. Nos. 7,621,506; 7,614,608; 7,422,407 and 7,179,041 and U.S. Published Patent Application No. 2009/0283732 by Mark Ebbenga, incorporated herein by reference. Moreover, there is usually a resilient engagement means such as a forked bumper 50 for engaging and positioning the boat bow.

Figure 6:
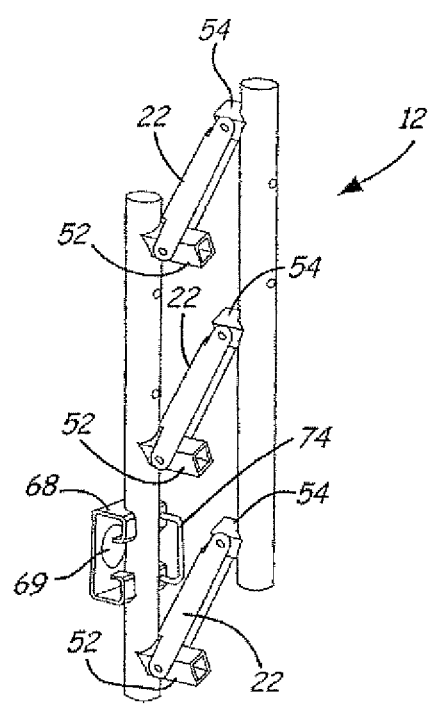
FIG. 6 is a perspective view of a ladder portion of the bow entry ladder assembly of FIG. 1, in a partially collapsed configuration.

In an exemplary embodiment, an additional feature of ladder portion 12 is that it is collapsible. As shown in FIGS. 2 and 6, rungs 22 are pivotally attached to side rail 18 at horizontal stubs 52; rungs 22 are pivotally attached to side rail 20 at horizontal stubs 54. As shown, stubs 52 are longer than stubs 54, thereby providing a top surface on which the rungs 22 rest when ladder portion 12 is in an open configuration. As illustrated, each rung 22 is configured in cross-section as an inverted U-shaped channel. FIG. 1 shows ladder portion 12 in a fully opened configuration. FIG. 2 shows an exploded view of ladder portion 12 to more clearly illustrate its component parts. FIG. 6 shows ladder portion 12 in a partially collapsed configuration, in which a distance between the first and second side rails 18, 20 decreases. The folded configuration is useful for making ladder portion 12 more compact for storage or transport. Ladder portion 12 can be maintained in the folded configuration by securing with a strap, for example one having facing portions comprising hook and loop fasteners.

Referring to FIGS. 2-5, clamp assembly 38 consists of brackets 60 and 62, which close around vertically extending post 37 of J-shaped tube extension member 36. FIGS. 1, 3, 4A and 4B show brackets 60 and 62 around vertically extending post 37 in a closed configuration. To remove brackets 60 and 62 from vertically extending post 37, a user pulls on handle 64 to pivot bracket 60 with respect to bracket 62 about pin 65, as illustrated in FIGS. 5A and 5B. This pulling action moves pin 66 within slot 67 enough to create an opening 71 about vertically extending post 37 that allows brackets 60 and 62 to be removed from vertically extending post 37. Creating the opening 71 also allows a user to pivot the brackets 60 and 62 about the vertically extending post 37 into any position in rotation plane R which is illustrated in FIG. 2. Pushing back on handle 64 tightens brackets 60 and 62 around vertically extending post 37, thereby securing ladder portion 12 in the desired position.

In an exemplary embodiment illustrated in FIG. 2, bracket 62 of clamp assembly 38 is pivotally attached to bracket 68 of side rail 18 at bore 69 such that bracket 62 rotates in plane Q. Plate 70 of bracket 62 is attached to plate 72 of bracket 68 on opposite sides of bore 69 via pins represented by 71. The rotational connection at bore 69 allows for adjustment of the inclination of ladder portion 12 with respect to attachment bracket portion 16. As shown in FIG. 2, spring-biased handle 74 passes through apertures or bores 76 of bracket 62 to secure ladder portion 12 in a vertical orientation. Spring-biased handle 74 can be pulled out and pivoted to rotate bracket 68 about bore 69. To retain ladder portion 12 in an inclined position relative to attachment bracket 16, spring-biased handle is released so that its ends pass through apertures or bores 78 of bracket 62, thereby securing ladder portion 12 in an inclined orientation. While only 2 positions are shown, it is contemplated that other incline positions will be possible by providing bores at other positions on bracket 62.

Accordingly, the disclosure describes a ladder assembly 10 that offers the user increased comfort, safety, and convenience. Once ladder assembly 10 is installed on trailer 42, the position of the ladder portion 12 is easily and quickly adjustable relative to the trailer 42 and watercraft 43, without requiring the use of tools, for optimal use with any combination of trailer 42 and watercraft 43. A rotational orientation of the ladder portion 12 with respect to the trailer 42 is infinitely adjustable by simply pulling on handle 64 to loosen clamping assembly 38 about vertically extending post 37 of J-shaped tube extension member, rotating clamping assembly 38 to the desired position, and then pushing handle 64 to close clamping assembly 38. In some cases, clamping assembly 38 is biased by a spring 39 or other means in the closed configuration shown in FIGS. 1, 3, 4A and 4B. In other cases, the closed configuration can be maintained by means such as a bolt and tightened nut such as a wing nut. Moreover, an inclination of ladder portion 12 is adjustable by pulling on handle 74, rotating bracket 68 with respect to bracket 62 about bore 69, and releasing handle 74 so that its ends engage either the pair of bores 76 for a vertical orientation or the pair of bores 78 for an inclined orientation. In some cases, rather than a handle with two ends engaging holes, a single pin can be used to engage a single hole. Additionally, the ladder portion is collapsible into a compact configuration for convenient storage and transport.

Although the present invention has been described with reference to preferred embodiments, workers skilled in the art will recognize that changes may be made in form and detail without departing from the scope of the invention.

What is claimed is:

1. A ladder for mounting on a vehicle trailer comprising:
an attachment bracket assembly mounted on the trailer wherein the attachment bracket assembly comprises an attachment bracket positioned parallel to a first side rail and a having at first pivotal connection with the first side rail and a second pivotal connection with the first side rail, the first pivotal connection having a pivotal axis in a plane perpendicular a pivotal axis of the second pivotal connection;
a hand rail extending vertically from within the first side rail wherein the hand rail comprises a slanted portion or curved end;
a second side rail parallel to the first side rail; and
a plurality of rungs pivotally connected to both the first and second side rails;
wherein the ladder is collapsible to decrease a distance between the first and second side rails, wherein the attachment bracket assembly comprises a first bracket having a plurality of apertures therein, the ladder further comprising: a second bracket attached to the first side rail and having a handle associated therewith, the handle having two ends; wherein the two ends of the handle cooperate with two apertures of the first bracket to secure the first side rail in an inclination orientation relative to the attachment bracket.

2. The ladder of claim 1 wherein the inclination of the first and second side rails relative to the attachment bracket assembly is adjustable.

3. The ladder of claim 2 wherein the inclination of the first and second side rails relative to the attachment bracket assembly is adjusted by a pivoting connection.

4. The ladder of claim 1 further comprising a plurality of stubs extending from each of the first and second side rails, each end the plurality of rungs being connected to one of the first and second side rails via connection to one of the stubs.

5. The ladder of claim 1 wherein each of the plurality of rungs has an inverted U-shaped cross-sectional configuration.

6. A ladder for mounting on a vehicle trailer comprising:
an attachment bracket mounted on the trailer wherein the attachment bracket is positioned parallel to a first side rail;

a second side rail parallel to the first side rail, the first and second side rails defining a plane;

a plurality of rungs connecting the first and second side rails;

a single pivotal connection of the attachment bracket to the first side rail, the pivotal connection allowing for rotation of the plane about a vertical axis, and allowing for rotation of the plane about a horizontal axis wherein the pivotal connection is disposed between the attachment bracket and the first side rail, wherein the pivotal connection comprises a pair of cooperating latch brackets closed around the vertical post, wherein the vertical axis is defined by the vertical post, wherein the cooperating latch brackets are spring-biased in a closed configuration around the vertical post.

7. The ladder of claim 6 wherein the attachment bracket is a bolt plate.

8. The ladder of claim 6 wherein the plane can be positioned in an infinite number of rotational positions about a vertical post.

9. The ladder of claim 6 wherein the cooperating latch brackets are held in a closed configuration around the vertical post by a fastener.

\* \* \* \* \*